United States Patent [19]
Saito et al.

[11] Patent Number: 5,586,993
[45] Date of Patent: Dec. 24, 1996

[54] SEALED STORAGE BATTERY AND MANUFACTURING METHOD THEREOF

[75] Inventors: Ken Saito; Naoyoshi Hinotsu; Hikaru Sakamoto; Koichi Hoshino, all of Iwaki, Japan

[73] Assignee: Furukawa Denchi Kabushiki Kaisha, Kanagawa, Japan

[21] Appl. No.: 456,564

[22] Filed: Jun. 1, 1995

[30] Foreign Application Priority Data

Jun. 3, 1994 [JP] Japan ................................. 6-121641

[51] Int. Cl.$^6$ ............................................. H01M 6/00
[52] U.S. Cl. ............................................. 29/623.2
[58] Field of Search ................... 29/623.2, 623.1; 429/54

[56] References Cited

U.S. PATENT DOCUMENTS

| | | | |
|---|---|---|---|
| 4,252,873 | 2/1981 | Epstein et al. | 29/623.1 X |
| 5,197,995 | 3/1993 | Lowton et al. | 29/623.2 |

FOREIGN PATENT DOCUMENTS

| | | | |
|---|---|---|---|
| 3128774 | 2/1983 | Germany | 29/623.2 |
| 3-11803 | 3/1991 | Japan . | |

OTHER PUBLICATIONS

Patent Abstracts of Japan, unexamined applications, E field, vol. 13, No. 232, May 29, 1989, The Patent Office Japanese Government, p. 34 E 765; & JP-A-01 038 965 (Matsushita Electric Ind. Co., Ltd.).

Patent Abstracts of Japan, unexamined applications, E field, vol. 15, No. 50, Feb. 6, 1991, The Patent Office Japanese Government, p. 130 E 1030; & JP-A-02 281 554 (Matsushita Electric Ind. Co., Ltd).

*Primary Examiner*—Donald R. Valentine
*Attorney, Agent, or Firm*—Frishauf, Holtz, Goodman, Langer & Chick

[57] ABSTRACT

A sealed storage battery has a sealing assembly including a hollow rivet mounted to a cover plate via a gasket and a lead piece connecting a positive collector to the hollow rivet. Mounting the hollow rivet to the cover plate is achieved by pressurizing a distal end portion of a hollow shaft of the hollow rivet with a punch having a conical tip end portion so as to caulk the distal end portion of the hollow rivet by enlarging the distal end portion diametrically outward. Tightness between the opposing surfaces of the members among the cover plate, hollow rivet, gasket and lead piece can be enhanced, providing excellent liquid leakage resistance in the battery. A valve body of a safety valve is housed in a positive terminal welded to the head of the hollow rivet.

4 Claims, 3 Drawing Sheets

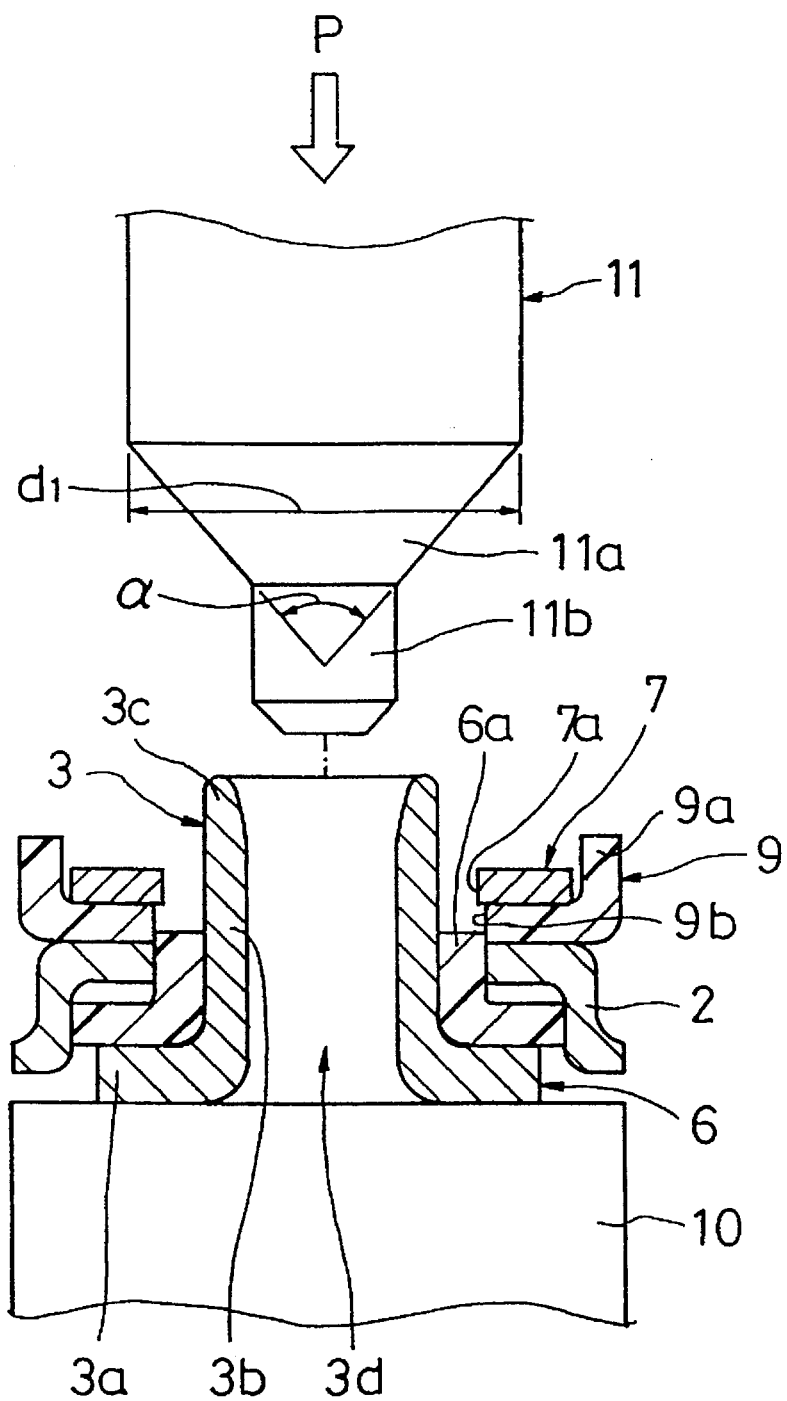

SEALED STORAGE BATTERY AND MANUFACTURING METHOD THEREOF

BACKGROUND OF THE INVENTION

1. Field of the Invention

This invention relates to a sealed storage battery having a safety valve for preventing excessive increase in the internal pressure of the battery, and more particularly to, a storage battery (secondary battery) of this kind having excellent resistance to liquid leakage, and a method for manufacturing the same.

2. Description of the Related Art

Sealed storage batteries are widely employed as power sources for small electric appliances because they are advantageous in that no supplement of electrolyte is required and no restriction is raised to their posture at the time of usage. The batteries of this type can roughly be classified into a cylindrical type and a square type in accordance with their outer shapes. The cylindrical type storage batteries, each having an electric power generator element obtained by spirally winding a positive sheet, a negative sheet and a separator interposed therebetween into a tubular form, can be manufactured with high efficiency. However, the cylindrical type batteries involve a problem that they tend to form a dead space when installed in appliances. The square type storage batteries eliminating such a problem include a generator element consisting of a plurality of positive plates and a plurality of negative plates, the positive and negative plates being laminated alternately via separators.

In these sealed storage batteries, to secure their hermetic sealing structure, the generator element is designed so as not to excessively increase the internal pressure of the battery by chemical reaction in the battery, and the open end of a container in which the generator element is received is sealed with a cover plate. However, it sometimes happens that the internal pressure increases excessively due to accidental short circuit in the battery or generation of gas upon overcharging the battery. In such cases, the container is likely to be damaged. To avoid this, a safety valve for preventing excessive increase in the internal pressure of the battery is disposed in a positive cap of the battery.

The sealed storage batteries of the aforementioned type are required to fix the positive cap to the cover plate in such a manner that electrical insulation and tightness (liquidtightness and gastightness) between the positive cap and the cover plate may be maintained, that the positive plates (positive sheets) are electrically connected to the positive cap, and that the safety valve disposed in the cap is communicated with the interior of the battery.

It is therefore conventionally known to seal the container using a sealing assembly which includes a hollow rivet. The hollow rivet is fitted via an insulating gasket in a center hole formed in the cover plate and is fixed to the cover plate, and the positive cap accommodating therein a safety valve is welded to the hollow rivet. Further, the positive cap is connected via the hollow rivet to the positive plate. With this sealing assembly, both fixing of the positive cap to the cover plate and electrical connection of the positive plate to the positive cap can be achieved by the hollow rivet, and also communication between the safety valve and the interior of the battery can be achieved by the bore of the hollow rivet.

FIGS. 1 and 2 show a square type sealed alkaline storage battery provided with the aforementioned type of sealing assembly. This storage battery is shaped into a rectangular parallelepiped form and has a reduced thickness, with a generator element $1a$ being housed in an outer can (container) 1. Further, an alkali electrolyte is charged into the container 1. The mark C denotes a sealing assembly to be mounted to the upper open end of the container 1. The sealing assembly C is welded along the entire circumference of the open end of the container 1 by means of laser welding.

More specifically, the sealing assembly C includes a cover plate 2 welded to the container 1. The cover plate 2 is formed at its center with a recess, and is formed with a through hole $2a$ extending through the center of the recess. A hollow rivet 3 is fitted in the through hole $2a$ via a gasket 6 for achieving electrical insulation and prevention of electrolyte leakage. The hollow rivet 3 has an annular head $3a$ and a cylindrical hollow shaft $3b$ formed integrally with the head $3a$, an axial bore $3d$ being formed in the hollow shaft $3b$. The head $3a$ is fitted in the recess of the cover plate 2 in such a way that the upper face of the head $3a$ is substantially flush with the upper surface of the cover plate 2. The axially inner end portion $3c$ of the hollow shaft $3b$ is caulked to an annular lead piece 7 disposed inside the cover plate 2. In achieving such caulking, an axial pressure is applied to the cover plate 2, gasket 6 and lead piece 7 by the head $3a$ and the inner end portion $3c$ of the hollow rivet 3. Thus, tightness between the opposing faces of the associated members among the cover plate 2, hollow rivet 3, gasket 6 and lead piece 7 can be enhanced, allowing the battery to have resistance to liquid leakage. Incidentally, a positive collector $1b$ connected to positive plates $1c$ is connected to the lead piece 7. In FIG. 2, reference numerals $1d$, $1e$ and $1f$ denote a negative plate, a separator and a lead for the associated positive plate, respectively.

A positive cap 4 which includes a valve body 5 of the safety valve is fixed to the head $3a$ of the hollow rivet 3. The positive cap 4, which is, as a whole, formed into a box-like shape, has an open bottom. Notches $4b$ are formed at the respective lower ends of two side faces $4a$ of the cap 4. The valve 5 normally operates to block the outer opening of the bore $3d$ of the hollow rivet 3 to maintain gastightness of the battery. In the event of abnormal rise in the internal pressure of the battery for some reasons, the valve 5 opens to let the interior of the battery communicate to the outside of the battery via the bore $3d$ of the hollow rivet 3 and the notches $4b$ of the positive terminal 4. Thus, the gas in the storage battery can be exhausted through the bore $3d$ and notches $4b$ to the outside of the battery to lower the internal pressure of the battery.

A sealed alkaline storage battery has been proposed in Japanese Utility Model Publication No. 3-11803, which is provided with the aforementioned type of sealing assembly and which has further improved liquid leakage resistance. In this proposed battery (see FIG. 3), when the inner end portion $3c$ of the hollow rivet 3 is to be caulked in the process of manufacturing the battery, an axially intermediate portion of the hollow shaft $3b$ of the hollow rivet 3 is expanded radially outward so as to apply an axial pressure to the cover plate 2, gasket 6 and lead piece 7 by the head $3a$ and inner end portion $3c$ of the hollow rivet 3, and at the same time apply a radially outward pressure to the gasket 6 by the outer circumference of the intermediate portion of the hollow shaft $3b$, thus improving tightness between the opposing surfaces of the associated members among the cover plate 2, hollow rivet 3 and gasket 6, in turn, resistance to liquid leakage in the battery.

By the way, to expand the hollow shaft $3b$ of the hollow rivet 3 radially outward as described above means to buckle the hollow shaft $3b$. Accordingly, in the operation of caulking the hollow rivet in the proposed battery, a punch 8 is employed, which has a main body provided with a caulking end surface $8a$, as indicated by the two-dotted chain line in FIG. 3, and which has a center shaft $8b$ formed integrally therewith and protruding axially outward from the caulking end surface $8a$. Namely, an axial pressure sufficient to buckle the hollow shaft $3b$ is applied to the inner end portion $3c$ of the hollow rivet 3 by the caulking end surface $8a$ of the punch 8, with the center shaft $8b$ of the punch 8 being fitted in the bore $3d$ of the hollow rivet 3, to caulk the inner end portion $3c$ and at the same time expand the hollow shaft $3b$ radially outward.

However, it is extremely difficult to expand radially outward the hollow shaft $3b$ at a desired axial position utilizing the buckling phenomenon. Namely, even if the center shaft $8b$ of the punch 8 is fitted in the bore $3d$ of the hollow rivet 3 to properly position the punch 8 with respect to the hollow rivet 3 when the hollow rivet 3 is to be pressurized by the punch 8, the position to be buckled is likely to change depending on variable factors including a minor material variation in the hollow shaft $3b$. Accordingly, the axial position of the hollow shaft $3b$ to be expanded, in turn, the position to which a radial force is to be applied by the expanded portion of the hollow shaft $3b$ to the gasket 6 is caused to change. Thus, it becomes difficult to maintain tightness between the opposing faces of the associated members among the cover plate 2, hollow rivet 3, gasket 6 and lead piece 7, which in turn makes it difficult to maintain the liquid leakage resistance of the battery at constant.

Meanwhile, if the hollow rivet 3 is pressurized in the axial direction to such a level as the hollow shaft $3b$ may be buckled, the lead piece 7 and cover plate 2 may sometimes be deformed, as shown in FIG. 3. If the lead piece 7 is deformed, a welding failure occurs when the lead piece 7 and the lead (shown by reference numeral $1f$ in FIG. 2) are welded in the subsequent step, or the lead piece 7 bites the gasket 6, as shown in the circle A of FIG. 3, so that the gasket 6 cannot achieve sufficient insulation between the lead piece 7 and the cover plate 2 to cause short circuit therebetween. Meanwhile, if the cover plate 2 is deformed as shown in the circle B of FIG. 3, there occurs a welding failure when the cover plate 2 is welded to the container 1 in the subsequent step, causing liquid leakage.

SUMMARY OF THE INVENTION

The object of the present invention is to provide a sealed storage battery having excellent resistance to liquid leakage, and a method for manufacturing the same.

According to the present invention, a sealed storage battery having a sealing assembly is provided. In the sealing assembly, a hollow rivet is fitted and fixed via an insulating gasket to an annular cover plate which seals an opening of a container, and a safety valve is received in an electrode cap fixed to a head of the hollow rivet such that the safety valve communicates with the interior of the battery via an axial bore formed in a hollow shaft of the hollow rivet.

The storage battery is characterized in that the hollow shaft is caulked, with its distal end portion (an end portion of the hollow shaft on the side away from the head of the hollow rivet) diametrically enlarged than an end portion of the hollow shaft on the side close to the head of the hollow rivet and than an intermediate portion of the hollow shaft, whereby the hollow rivet is fixed to the cover plate.

Preferably, the distal end portion of the hollow shaft of the hollow rivet is shaped into a truncated cone. More preferably, the distal end portion of the hollow shaft is shaped into that truncated cone whose imaginary extension forms a cone having an apex angle of 30 to 50 degrees.

Preferably, the storage battery includes an annular lead piece which is disposed on the side away from the electrode cap with respect to the cover plate in an axial direction of the hollow rivet, and which is fitted to the hollow rivet; positive plates are connected to the lead piece; and an insulating gasket is interposed between the lead piece and the cover plate.

Preferably, the storage battery is a sealed alkaline storage battery containing an alkali electrolyte.

According to the present invention, a method for manufacturing a sealed storage battery in which a sealing assembly of the storage battery is assembled is provided. The manufacturing method is characterized in that the assembling of the sealing assembly comprises the steps of: fitting an annular cover plate to a hollow shaft of a hollow rivet via an insulating gasket; inserting a conical tip end portion of a punch into a bore of the hollow shaft from the side of the bore away from a head of the hollow rivet; and pressurizing the punch toward the head of the hollow rivet to cause an end portion of the hollow rivet on the side away from the head of the hollow rivet to be diametrically enlarged and caulked by the conical tip end portion of the punch, whereby the hollow rivet is fixed to the cover plate via the insulating gasket.

Preferably, the punch having the conical tip end portion whose apex angle is smaller than that apex angle which buckles the hollow shaft is employed. More preferably, the punch having the conical tip end portion which has the apex angle of 30 to 50 degrees is employed.

Preferably, the step of inserting the punch into the bore of the hollow shaft includes a sub-step of inserting a positioning center shaft provided at a tip end of the conical tip end portion of the punch into the bore of the hollow shaft.

Preferably, the manufacturing method includes a step of mounting the assembled sealing assembly to the opening of the container of the storage battery, to thereby seal the container.

These and other objects and advantages will become more readily apparent from an understanding of the preferred embodiments described below with reference to the following drawing figures.

BRIEF DESCRIPTION OF THE DRAWINGS

The invention will become more fully understood from the detailed description given hereinbelow with reference to the accompanying figures, given by way of illustration only and not intended to limit the present invention in which:

FIG. 5 is a fragmentary vertical sectional view showing the sealing assembly shown in FIG. 4 in a state prior to a caulking process.

DETAILED DESCRIPTION OF PREFERRED EMBODIMENT

Figure 4:
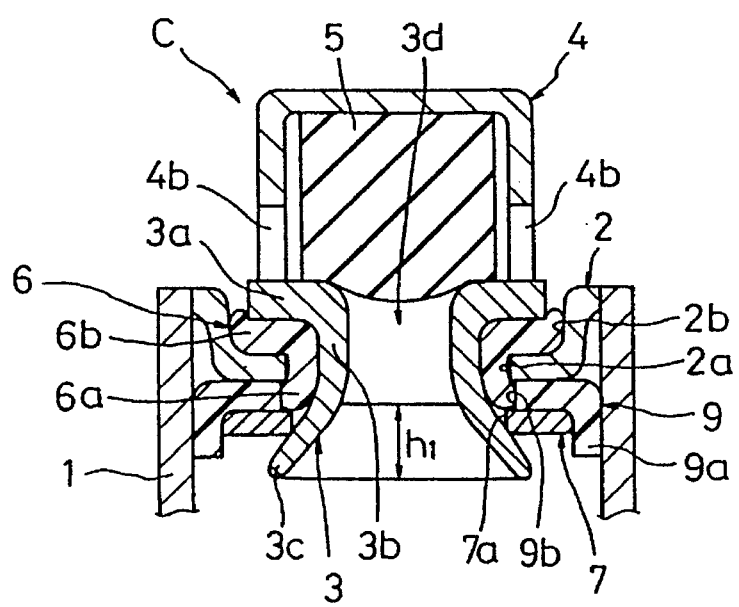
FIG. 4 is a fragmentary vertical sectional view of a sealing assembly of a sealed alkaline storage battery according to the present invention.

With reference to FIGS. 4 and 5, a sealed storage battery (hereinafter simply referred to as battery) according to the present invention, and a method for manufacturing the same will be described.

Figure 1:
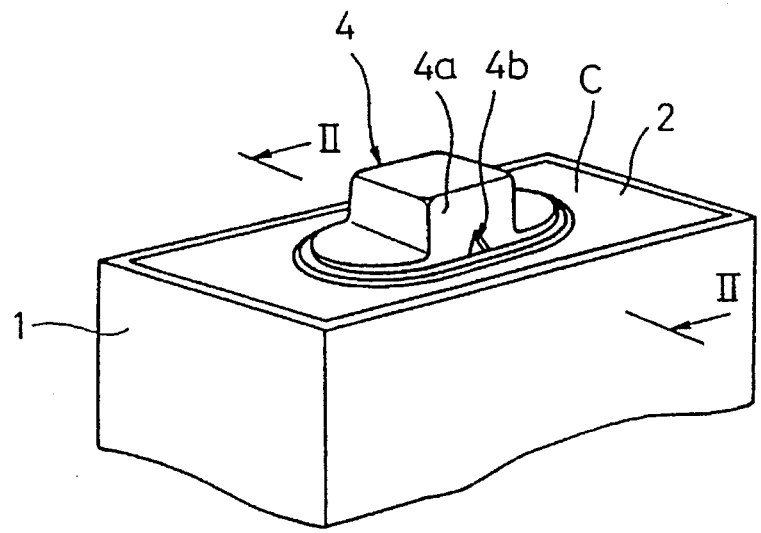
FIG. 1 is a fragmentary schematic perspective view of a conventional square type sealed alkaline storage battery.
Figure 2:
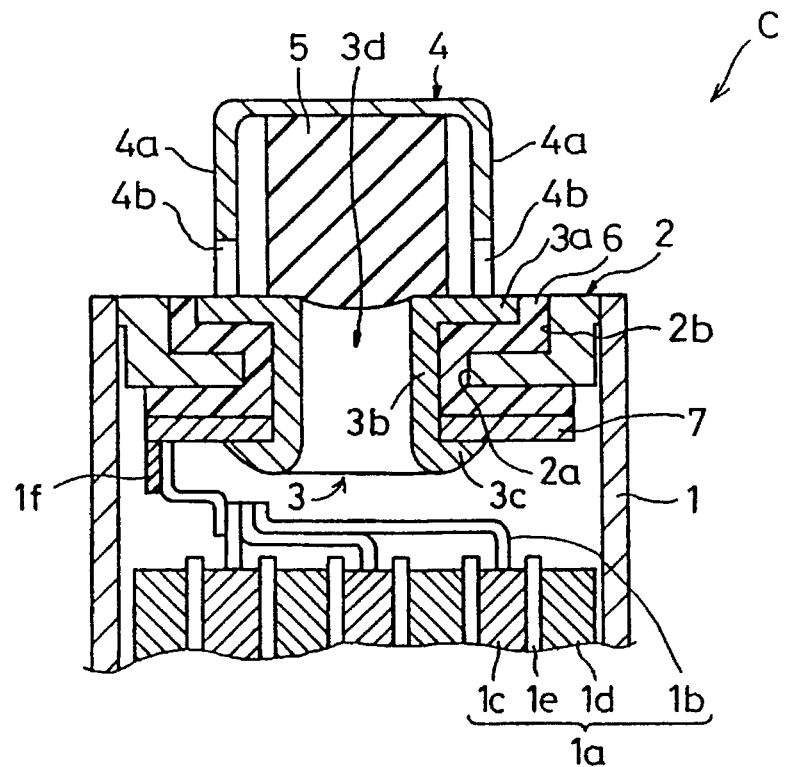
FIG. 2 is a fragmentary vertical sectional view of a sealing assembly of the battery shown in FIG. 1 taken along the line II—II of FIG. 1.
Figure 3:
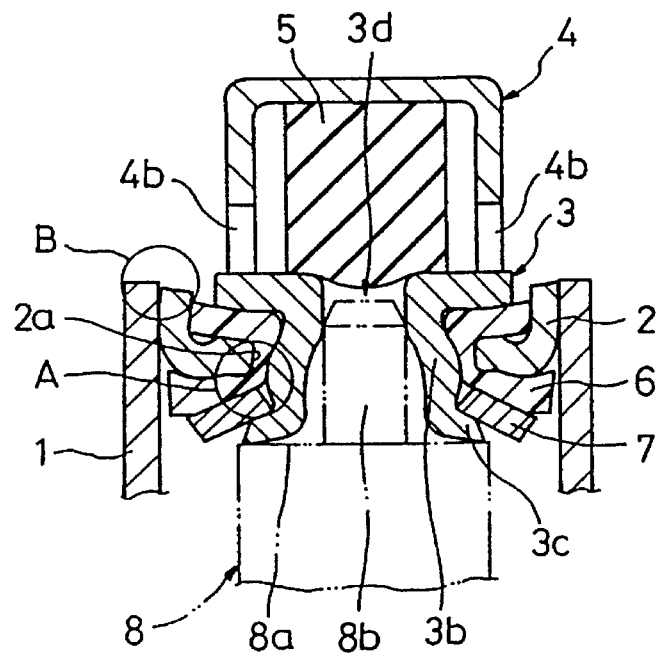
FIG. 3 is a fragmentary vertical sectional view of a sealing assembly of a conventional sealed alkaline storage battery of a type different from the battery shown in FIGS. 1 and 2.

The battery is featured in that the distal end portion $3c$ of a hollow shaft $3b$ of a hollow rivet 3 in a sealing assembly C is caulked by diametrically enlarging the distal end portion $3c$ without buckling the hollow shaft $3b$. It should be noted here that the basic structure of the battery is the same as those of the conventional sealed storage batteries shown in FIGS. 1 to 3, so that description of the basic structure will partly be omitted.

The sealing assembly C has a metallic cover plate 2. The cover plate 2 has an oval recess $2b$ formed at the center on the upper surface thereof, and a center hole $2a$ formed concentrically with the recess $2b$. The center hole $2a$ is used for fitting a gasket 6 and the hollow rivet 3 to the cover plate 2.

The hollow rivet 3 is fixed to the cover plate 2 via the gasket 6 and a lead piece 7 by caulking its distal end portion $3c$, and serves to maintain tightness of the battery. The material constituting the hollow rivet 3 may not particularly be limited, so long as it can be fixed to the cover plate 2 together with the gasket 6 and lead piece 7 by caulking the distal end portion $3c$. Namely, the hollow rivet 3 is made, for example, of nickel-plated iron, preferably soft iron. The hollow rivet 3 is formed to have appropriate dimensions and profile, for example, into a cylindrical form having a suitable length, taking the height h1 of the distal end portion $3c$ to be enlarged by the caulking process, etc. into consideration.

A positive terminal (positive cap) 4 has a shape which is substantially the same in plan as that of the head $3a$ of the hollow rivet 3, and is fixed to the head $3a$ of the hollow rivet 3, for example, by means of spot welding. Two side faces of the positive terminal 4 are formed with notches $4b$, respectively, which serve as passages for discharging the gas generated in the battery.

A valve body 5 received in the positive cap 4 opens whenever the pressure of the gas generated in the battery and applied through the bore $3d$ of the hollow rivet 3 to the valve 5 exceeds a predetermined level, so as to reduce the internal pressure of the battery. The structure of the valve 5 and the material constituting it may not particularly be limited, so long as the valve 5 can open whenever the internal pressure of the battery increases excessively to release the gas. For example, a rubber valve can preferably be used.

The gasket 6 and an insulating spacer 9 secure electrical insulation between the cover plate 2 serving as a negative element and the hollow rivet 3 serving as a positive element and between the cover plate 2 and the lead piece 7 serving as a positive element. The gasket 6 and the spacer 9 also serve to prevent leakage of the electrolyte charged in an outer can or container 1.

The gasket 6 has a cylindrical portion $6a$ having an outer diameter slightly smaller than the center hole $2a$ of the cover plate 2 and an inner diameter slightly greater than the outer diameter of the hollow shaft $3b$ of the hollow rivet 3, and a flange $6b$ formed integrally with the cylindrical portion $6a$ and having an oval shape which is substantially the same as the oval recess $2b$ formed on the cover plate 2.

The insulating spacer 9 is interposed between the cover plate 2 and the lead piece 7 or between the cover plate 2 and the hollow rivet 3 to achieve electrical insulation between the associated surfaces among the cover plate 2, hollow rivet 3 and lead piece 7. The insulating spacer 9 has a rectangular shape which is substantially the same in plan as that of the cover plate 2, and is formed at the center thereof with a bore $9b$ whose diameter is slightly greater than the outer diameter of the cylindrical portion $6a$ of the gasket 6. The hollow shaft $3b$ extends through the center hole $9b$. The insulating spacer 9 is provided at its outer peripheral edge with an annular ridge $9a$ which extends away from the cover plate 2 when assembled into the battery. The annular ridge $9a$ engages resiliently with the inner circumference of the container 1, when the sealing assembly C is fitted in the opening of the container 1, to retain the sealing assembly C in position.

The material constituting the gasket 6 or the insulating spacer 9 may not particularly be limited, so long as it has electrically insulating property, is not deteriorated by the electrolyte and can maintain tightness. Namely, the gasket 6 and insulating spacer 9 are, for example, made of a plastic or rubber coated on the surface with a sealing material, more preferably of a nylon resin. Further, the gasket 6 and insulating spacer 9 may not necessarily be separate members but may be formed into an integral member, so long as it can exhibit electrically insulating capacity and tightness maintaining capacity.

The lead piece 7 secures electrical connection between the positive terminal 4 and positive plates $1c$ in an electrical power generator element $1a$, via positive collectors $1b$ connected to the lead piece 7 and the hollow rivet 3 on which the lead piece 7 is fitted. The lead piece 7 also serves as a washer when the hollow rivet 3 is to be caulked. As the lead piece 7, a conductive thin plate, preferably a nickel foil or a nickel-plated thin plate is employed. The lead piece 7 is formed with a bore $7a$ whose diameter is slightly greater than the outer diameter of the hollow shaft $3b$.

Now, a method for manufacturing the thus constituted battery will be described below.

Before production of the battery, the above-described battery components are provided. These components are produced in a conventional manner, so that description thereof will be omitted.

In assembling the sealing assembly C of the battery, the gasket 6 is fitted to the cover plate 2 by inserting the cylindrical portion $6a$ of the gasket 6 into the hole $2a$ of the cover plate 2, and then the hollow shaft $3b$ of the hollow rivet 3 is inserted into the cylindrical portion $6a$ of the gasket 6. Thus, the hollow rivet 3 can be inserted into the hole $2b$ of the cover plate 2 via the gasket 6. Incidentally, instead of carrying out assembly as described above, the hollow shaft $3b$ of the hollow rivet 3 may first be inserted to the cylindrical portion $6a$ of the gasket 6, and then the resulting assembly of the hollow rivet 3 and gasket 6 may be inserted into the hole $2a$ of the cover plate 2.

Next, the assembly of the cover plate 2, hollow rivet 3 and gasket 6 is placed on an anvil 10 with the head $3a$ of the hollow rivet 3 being abutted against the anvil 10, as shown in FIG. 5, and then the insulating spacer 9 and the lead piece 7 are fitted on the hollow shaft $3b$ in this order. Further, a punch 11 is provided for caulking the distal end portion $3c$ of the hollow rivet 3 on which the components 2, 6, 7 and 9 are fitted.

The punch 11 has a conical tip end portion $11a$ for enlarging the diameter of the distal end portion $3c$ of the hollow rivet 3. The punch 11 is designed to have an outer diameter d1 sufficient to enlarge the diameter of the distal end portion $3c$ of the rivet 3 to a predetermined size. The apex angle α of the conical tip end portion 11a is designed to be within the range of 30 to 50 degrees, preferably 35 to 45 degrees.

If the apex angle α is greater than 50 degrees, the axial component (caulking force) of the pressure to be applied to the hollow shaft 3b of the hollow rivet 3 will be too large, so that it can happen that the hollow shaft 3b is buckled, and that the radial component of the pressure to be applied to the hollow shaft 3b becomes too small to properly enlarge the diameter of the distal end portion 3c of the hollow shaft 3b. On the other hand, if the apex angle α is smaller than 30 degrees, the caulking force will be small, and the length of the distal end portion 3c of the hollow shaft 3b to be diametrically enlarged becomes very long.

The punch 11 preferably has a center shaft 11b formed on the conical tip end portion 11a in alignment with the punch axis. The center shaft 11b is slightly smaller in diameter than the inner diameter of the hollow shaft 3b of the hollow rivet 3 and serves to accurately position the punch 11 with respect to the hollow rivet 3.

In the caulking step, the center shaft 11b of the punch 11 is first fitted in the bore 3d of the hollow rivet 3. Thus, the axis of the punch 11 can be aligned with the axis of the hollow rivet 3 to achieve positioning of the punch 11 accurately with respect to the hollow rivet 3. Next, a pressure P is applied to the punch 11 with the conical surface of the conical tip end portion 11a of the punch 11 being abutted against the distal end portion 3c of the hollow shaft 3b of the hollow rivet 3. It should be noted here that the optimum level of pressure P varies depending on the material, size, shape, etc. of the hollow rivet 3 and of the peripheral components associated there-with, so that the optimum pressure P is determined by experiments or computer simulation.

When the pressure P is applied to the punch 11, the conical tip end portion 11a of the punch 11 slides gradually in the hollow shaft 3b toward the head 3a of the hollow rivet 3, with the conical surface of the punch 11 being brought in urged contact with the inner circumference of the hollow shaft 3b of the hollow rivet 3. In this process, since an optimum pressure is applied to the hollow shaft 3b of the hollow rivet 3 using a punch having a cone which has an apex angle of 30 to 50 degrees, both the axial component and the radial component of the pressure to be applied to the hollow shaft 3b can be optimized, causing no buckling of the hollow shaft 3b. Upon application of pressurization with the punch 11, the distal end portion 3c of the hollow shaft 3b is gradually diametrically enlarged by the conical tip end portion 11a of the punch 11 in slide contact therewith, to be shaped into a form of truncated cone which is complementary to the conical tip end portion 11a. More specifically, the distal end portion 3c is shaped into a form of truncated cone such that the imaginary extension of the distal end portion 3c forms a cone having an apex angle of 30 to 50 degrees.

If the hollow rivet 3 is caulked, as described above, the gasket 6 is pressurized by the entire outer circumference of the hollow shaft 3b of the hollow rivet 3 to secure a required resistance to liquid leakage and to prevent deformation of the lead piece 7 and cover plate 2.

After completion of caulking, the positive terminal 4 accommodating therein the valve 5 is welded to the head 3a of the hollow rivet 3, completing assembly of the sealing assembly C.

Further, the sealing assembly C is fitted in the opening of the battery container 1 in which the generator element 1a is inserted and an electrolyte is charged, and in this state the cover plate 2 of the sealing assembly C is welded to the battery container 1 to seal the container 1, completing production of the battery.

Batteries of Examples 1 to 3 according to the present invention and those of Comparative Examples 1 to 3 will be described below.

Sealed alkaline storage batteries of Examples 1 to 3 and Comparative Examples 1 to 3 were produced in an amount of 1000 sets, respectively. The punches used for producing these batteries in Examples and Comparative Examples have a common shape as shown in FIG. 5 and also have an outer diameter of 4.0 mm, a center shaft outer diameter of 0.8 mm and a center shaft length of 1.0 mm. However, the punches used in Examples are different from those in Comparative Examples in the apex angle of the cone, as shown in Table 1. Further, as a conventional punch, one having a shape as indicated by the two-dotted chain line in FIG. 3 and having an outer diameter of 4.0 mm, a center shaft outer diameter of 1.0 mm and a center shaft length of 2.0 mm was used.

The hollow rivet 3 is made of soft iron and has the following dimensions: major (apse) head length=6.0 mm; minor head length=4.0 mm; bore diameter=1.5 mm; hollow shaft outer diameter=2.0 mm; hollow shaft height=3.0 mm; thickness=0.4 mm.

The gasket 6 and the insulating spacer 9 are made of Nylon. The gasket 6 has a thickness of 0.4 mm and 0.3 mm at the cylindrical portion 6a and at the flange 6b, respectively, and the insulating spacer 9 has a thickness of 0.3

The lead piece 7 is made of soft iron and has the following dimensions: major length=8 mm; minor length=4 mm; thickness 0.3 mm.

The cover plate 2 is made of soft iron and the following dimensions: major length=16 mm; minor length=5 mm; thickness=0.4 mm.

The thus produced batteries (1,000 sets) were examined, after the caulking treatment, for defective shapes in the sealing assemblies, buckling of the hollow rivets and resistance to liquid leakage in the following manner.

The number of defective shapes and the number of liquid leakage occurred in these batteries were counted, to calculate rate of defective shape occurrence (%) and the rate of liquid leakage occurrence (%).

The results are shown in Table 1.

Liquid Leakage Resistance Test

The batteries subjected to a charging step were left to stand under a condition where temperature and humidity are kept at 45 degrees C. and 90 to 95%, and presence of liquid leakage was confirmed by applying every 15 days red litmus papers to the fitting sections of the hollow rivets on the cover plates 2 and thereabound.

After completion of the caulking treatment using the punches, defective shapes of the sealing assemblies were confirmed by visually observing presence of deformation of the cover plates and lead pieces and buckling of the hollow rivets, which will cause defective sealing welding and short circuit between the cover plate and the hollow rivet.

TABLE 1

|  | Punch apex angle (deg.) | Shape Defect Rate (%) | Leakage Rate (%) | | | | | | |
| --- | --- | --- | --- | --- | --- | --- | --- | --- | --- |
|  |  |  | 15 days | 30 days | 45 days | 60 days | 75 days | 90 days | 105 days |
| Example 1 | 30 | 0.01 | 0 | 0 | 0 | 0 | 0 | 0.01 | 0.03 |
| Example 2 | 40 | 0.01 | 0 | 0 | 0 | 0 | 0 | 0 | 0.01 |
| Example 3 | 50 | 0.01 | 0 | 0 | 0 | 0 | 0 | 0.01 | 0.03 |
| Comp. Example 1 | 20 | 0 | 0.1 | 0.2 | 0.5 | 1.0 | 1.5 | 1.8 | 2.5 |
| Comp. Example 2 | 60 | 0.5 | 0 | 0 | 0 | 0.4 | 1.1 | 1.6 | 2.0 |
| Comp. Example 3 | Prior art punch | 0.5 | 0 | 0 | 0 | 0.5 | 1.2 | 1.6 | 2.0 |

As the results indicated in Table 1 clearly show, it was identified that the rate of liquid leakage occurrence and the rate of defective shape occurrence in the sealing assemblies in the sealed alkaline storage batteries produced according to the method of the present invention are extremely low compared with those of Comparative Examples.

Further, when the apex angle of the cone of the punch is smaller than the range specified for the method of the present invention (as in Comparative Example 1), the hollow rivet is not buckled, and the cover plate and lead piece are not deformed much. However, the rate of liquid leakage occurrence is high, demonstrating that pressurization to be achieved by caulking of the hollow rivet is not sufficient.

On the contrary, when the apex angle of the cone of the punch is greater than the range specified for the method of the present invention (as in Comparative Example 2), the rate liquid leakage occurrence is low because of sufficient pressurization achieved by caulking of the hollow rivet, but the cover plate and lead piece are deformed, to cause defective sealing welding or short circuit.

Meanwhile, when the conventional punch is employed (as in Comparative Example 3), the rate liquid leakage occurrence is low because of sufficient pressurization achieved by caulking of the hollow rivet, but the cover plate and lead piece are deformed, to cause defective sealing welding or short circuit, like in Comparative Example 2.

As has been described heretofore, in the process of caulking the hollow rivet, according to the present invention, the distal end portion of the hollow shaft of the hollow rivet is caulked by diametrically enlarging the distal end portion without causing buckling of the hollow shaft, so that tightness between the hollow rivet and the gasket can be greatly improved. Further, the caulking process can be carried out at high reproducibility compared with the conventional method resorting to buckling, providing sealed storage batteries having high reliability with respect to tightness and resistance to liquid leakage. Besides, since caulking treatment can be carried out without deforming the lead piece and cover plate, short circuit between the lead piece and the cover plate can be prevented. Moreover, the sealing assembly can securely be seal-welded to the container, and thus the batteries of the invention show excellent tightness and liquid leakage resistance at the welded section.

It should be noted here that the present invention can be applied to square type or cylindrical type sealed storage batteries other than square type sealed alkaline storage batteries.

From the above-described embodiment of the present invention, it is apparent that the present invention may be modified as would occur to one of ordinary skill in the art without departing from the spirit and scope of the present invention which should be defined solely by the appended claims. All such modifications as would be obvious to one of ordinary skill in the art should not be regarded as a departure from the spirit and scope of the invention, and should be included within the scope of the invention as defined solely by the appended claims.

What is claimed is:

1. A method for manufacturing a sealed storage battery in which a sealing assembly of said battery is assembled, the improvement wherein said assembling of said sealing assembly includes the steps of:

fitting an annular plate cover to a hollow shaft of a hollow rivet via an insulating gasket;

inserting a conical tip end portion of a punch into a bore of said hollow shaft from a side of said bore away from a head of said hollow rivet, said inserting step including a sub-step of inserting a positioning center shaft provided at a tip end of the conical tip end portion of said punch into the bore of said hollow shaft; and pressurizing said punch toward the head of said hollow rivet, to cause an end portion of said hollow rivet on a side away from the head of said hollow rivet to be diametrically enlarged and caulked by the conical tip end portion of said punch, whereby said hollow rivet is fixed to said cover plate via said insulating gasket.

2. The method according to claim 1, wherein a punch having a conical tip end portion whose apex angle is smaller than that apex angle which buckles said hollow shaft is employed.

3. The method according to claim 1, wherein a punch having a conical tip end portion which has an apex angle of 30 to 50 degrees is employed.

4. The method according to claim 1, further including the step of:

mounting said assembled sealing assembly to an opening of a container of said battery, to thereby seal said container.

* * * * *